United States Patent [19]

Chung et al.

[11] Patent Number: 5,057,785
[45] Date of Patent: Oct. 15, 1991

[54] METHOD AND CIRCUITRY TO SUPPRESS ADDITIVE DISTURBANCES IN DATA CHANNELS

[75] Inventors: Paul W. Chung; Michael O. Jenkins, both of San Jose; Stephen A. Jove, Watsonville; Klaas B. Klaassen, San Jose; Paik Saber, San Jose; Jacobus C. L. van Peppen, San Jose, all of Calif.

[73] Assignee: International Business Machines Corporation, Armonk, N.Y.

[21] Appl. No.: 468,526

[22] Filed: Jan. 23, 1990

[51] Int. Cl.$^5$ .......................... H03B 1/00; H03B 1/04
[52] U.S. Cl. .................................. 328/162; 328/167; 381/94; 307/521
[58] Field of Search ............... 328/162, 163, 165, 167; 455/296, 303, 304, 306; 381/71, 94; 307/520, 521

[56] References Cited

U.S. PATENT DOCUMENTS

| | | | |
|---|---|---|---|
| 3,911,776 | 10/1975 | Biegel | 307/521 |
| 4,177,430 | 12/1979 | Paul | 328/163 |
| 4,577,238 | 3/1986 | Watanabe | 328/162 |
| 4,648,118 | 3/1987 | Hitotsamachi | 381/92 |
| 4,859,883 | 8/1989 | Bradinal | 328/162 |
| 4,914,398 | 4/1990 | Jove et al. | 328/167 |

Primary Examiner—Timothy P. Callahan
Attorney, Agent, or Firm—Henry E. Otto, Jr.

[57] ABSTRACT

A method and circuitry for suppressing additive transient disturbances in an analog differential input signal, such disturbances being due, for example, to thermal asperity transients caused by an MR transducer contacting a moving storage surface. The input data signal is algebraically summed with a corrective feedback signal for providing as output signal. The output signal is fed back to a circuit including an envelope detector and differentiator and converted into another signal that is the derivative of an amplitude envelope corresponding to the output signal. Nonlinear signal-adaptive filter means converts said other signal into the corrective feedback signal, which substantially replicates the additive transient disturbance and is subtracted from the data input signal to render the output signal substantially free of the transient disturbance.

The input, output and corrective signals are preferably differential signals.

13 Claims, 2 Drawing Sheets

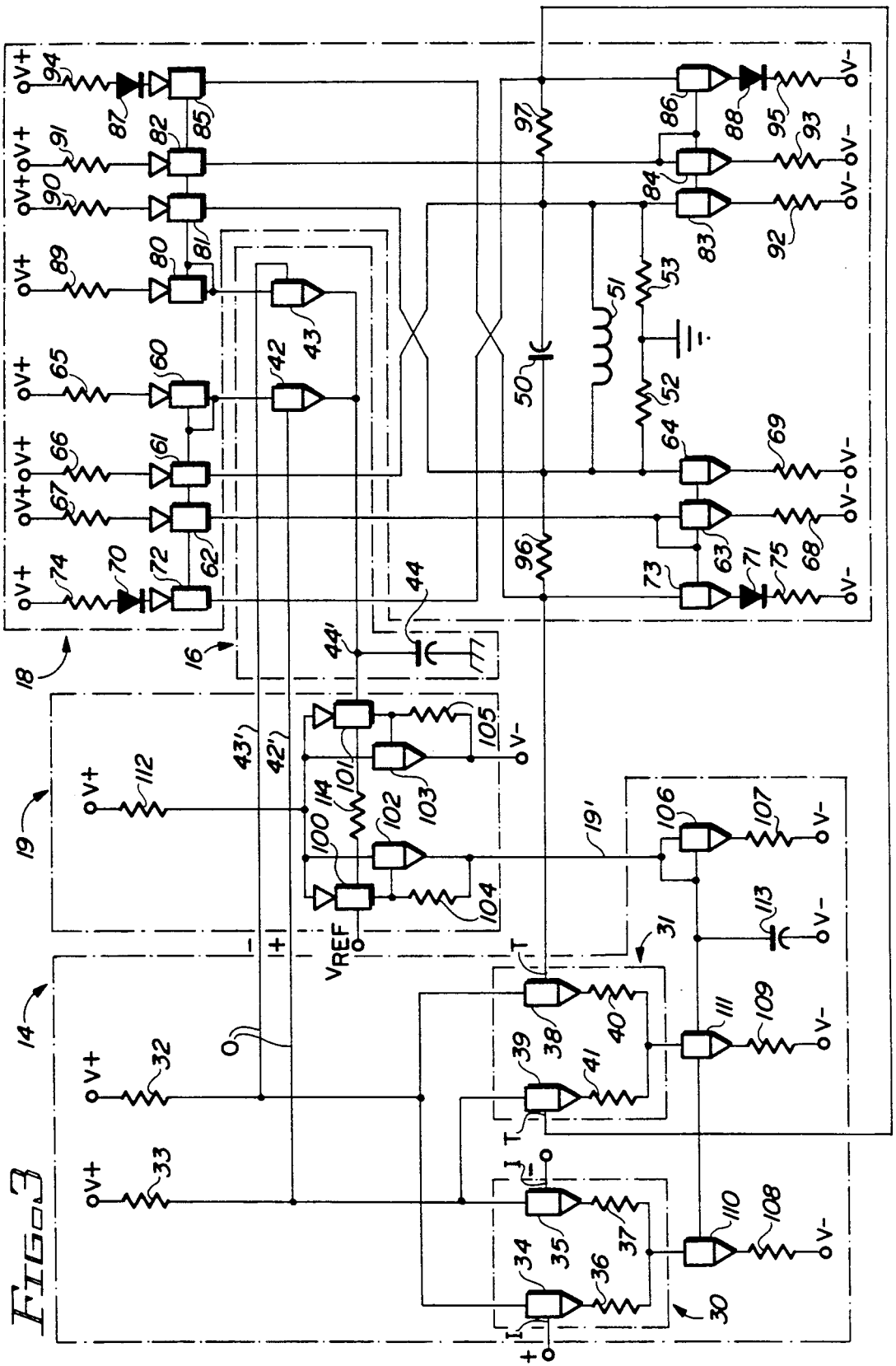

METHOD AND CIRCUITRY TO SUPPRESS ADDITIVE DISTURBANCES IN DATA CHANNELS

This invention relates to a method and circuitry for detecting and removing additive transient disturbances in a data channel, and more particularly, to a method and circuitry employing a signal feedback technique for suppressing electrical transients caused by a temperature change in a magnetoresistive (MR) transducer due to physical contact of said transducer with the recording surface of a moving magnetic medium.

BACKGROUND OF THE INVENTION

The most pertinent prior art of which applicants are aware is the allowed copending application U.S. Ser. No. 07/226,634, filed Aug. 1, 1988, which discloses a method and circuitry employing a signal feed-forward technique for suppressing additive transient disturbances in a data channel. Such disturbances may be due to thermal asperity transients caused by an MR transducer contacting a moving storage surface.

This prior art method and circuitry operates satisfactorily when, as in the case of the just-described thermal asperity transient, the additive disturbances of the analog input signal are monopolar; i.e., the disturbances are known in advance to be of either positive or negative polarity. In other words, the circuitry is unable to accommodate additive transient disturbances that at one time may be of positive polarity and at other times of negative polarity. This is due, in part, to the so-called "peristaltic" connection required for positive/negative envelope detection. This prior method and circuitry employs essentially a feed-forward approach wherein branch gains are critical. Also this prior method, as disclosed, operates best only when the additive disturbance has at most one time constant associated with the decay.

Other prior art of incidental interest includes U.S. Pat. No. 4,843,583 which discloses an arrangement employing feedback of a signal to a nonlinear adaptive filter and an adjustable linear filter serially connected thereto. A processor is used to generate intermediate signals and then a second processor is used to obtain a desired output.

There is a need for a method and circuitry (1) capable of handling both positive and negative polarity additive disturbances without preconditioning; (2) capable of handling disturbances with more than one time constant involved in the decay, without requiring a prefilter; and (3) less susceptible to noise and internal circuit offsets than methods and circuitry heretofore proposed.

SUMMARY OF THE INVENTION

A method and circuitry are disclosed for suppressing additive transient disturbances in an analog differential input signal, such disturbances being due, for example, to thermal asperity transients caused by an MR transducer contacting a moving storage surface. The input data signal is algebraically summed with a corrective feedback signal for providing as output signal. The output signal is fed back to a circuit including an envelope detector and differentiator and converted into another signal that is the derivative of an amplitude envelope corresponding to the output signal. Nonlinear signal-adaptive filter means converts said other signal into the corrective feedback signal, which substantially replicates the additive transient disturbance and is subtracted from the data input signal to render the output signal substantially free of the transient disturbance.

The input, output and corrective signals are preferably differential signals.

BRIEF DESCRIPTION OF THE DRAWINGS

FIG. 3 is a more detailed diagram of the circuitry illustrated in FIG. 2.

DESCRIPTION OF PREFERRED EMBODIMENT

OVERVIEW

Figure 1:
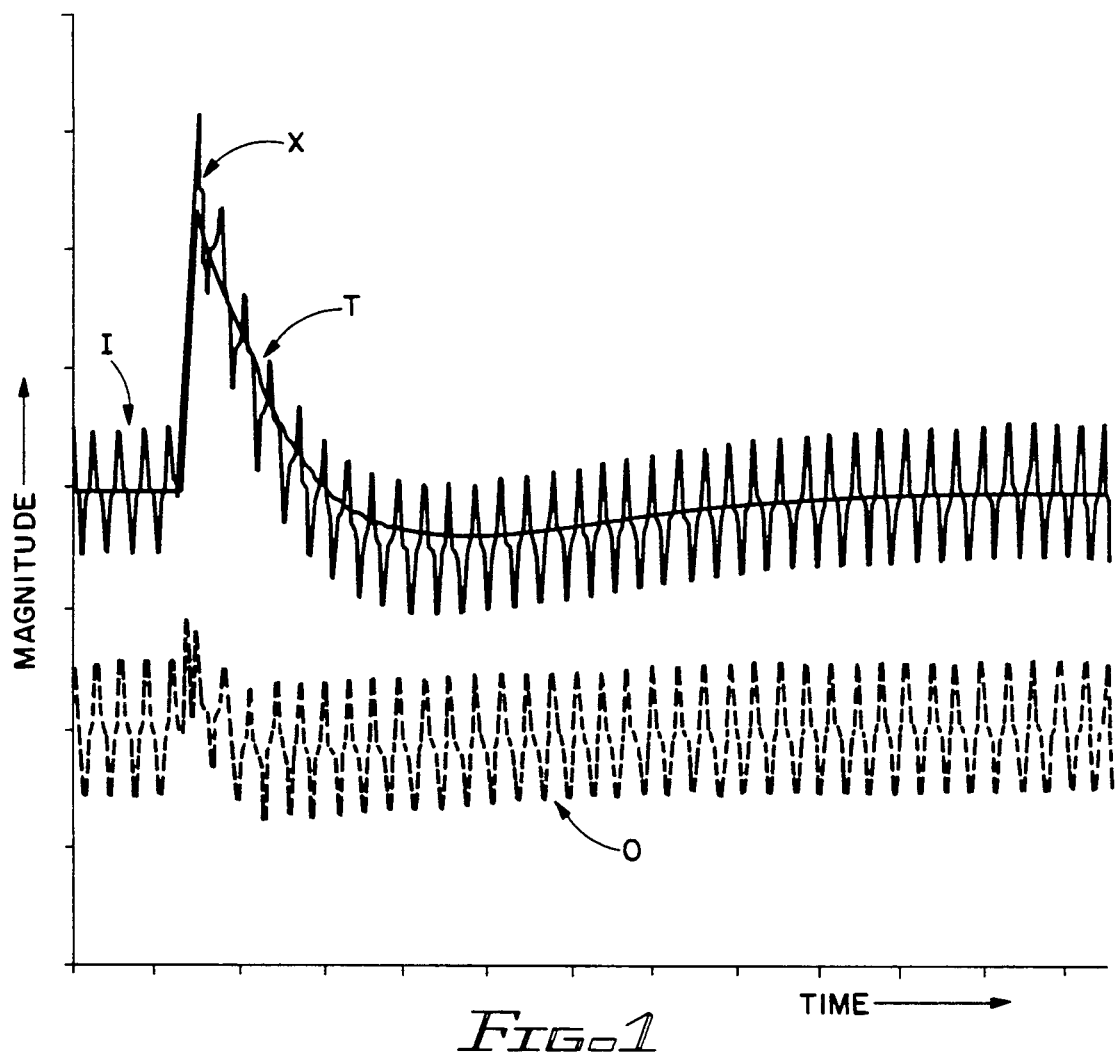
FIG. 1 depicts a differential input signal and an additive transient disturbance superimposed thereon, and a differential output signal from which the additive disturbance has been removed.
Figure 2:
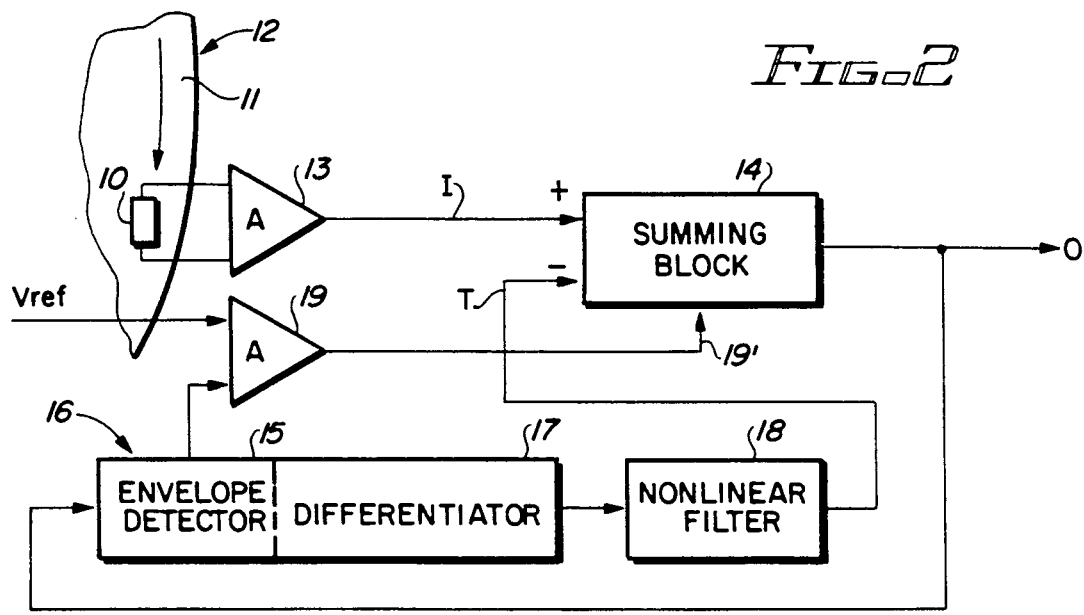
FIG. 2 is a schematic, simplified diagram of circuitry embodying the invention for suppressing the additive transient disturbance.

FIG. 1 depicts an analog data input signal I and an additive transient disturbance X superimposed thereon. As schematically illustrated in FIG. 2, a circuit embodying the invention can suppress such an additive disturbance to provide an output signal O (FIG. 1) free of the additive disturbance. This circuit insures that only the additive component (such as due to thermal transients) will be detected and not the multiplicative component (due to density modulation resulting from bit density variations).

Referring to FIG. 2, assume initially that input signal I contains data and the superimposed additive disturbance X due, for example, to a thermal asperity transient caused by an MR transducer 10 contacting the surface 11 of a rotating storage disk 12 of a disk file.

Signal I including disturbance X, as amplified by a preamplifier 13, is initially passed via a summing block 14 to an envelope detector portion 15 of a circuit 16 that, as illustrated, also comprises a differential differentiator portion 17. The envelope detector portion 15 outputs this additive disturbance initially as a step that is converted to a narrow pulse by the differentiator portion 17. This differentiation aids circuit 16 in responding rapidly to the disturbance and minimizes the adverse effect on output signal O. When the amplitude of the narrow pulse that is output from the differentiator portion 17 exceeds a preselected threshold, a nonlinear signal-adaptive filter 18 amplifies said pulse with high gain and applies it to a passive network forming part of the filter. This passive network has a natural response trajectory similar to that of the nominal expected additive disturbance. The output T (FIG. 1) of nonlinear filter 18 is fed back to summing block 14 with the correct polarity to cancel the additive disturbance from the output signal O.

During the transient portion of the disturbance, small errors between the actual additive disturbance and the output of the nonlinear filter 18 can result in signal peaks of one polarity that slightly exceed the envelope for output signal O. These produce small steps at the output of envelope detector portion 15 and hence small pulses at the output of the differentiator portion 17 of circuit 15. These small pulses will not exceed the aforementioned threshold in nonlinear filter 18. These pulses are multiplied by a suitably smaller gain and applied to the passive network of filter 18 as "mid-course" corrections to the trajectory of its transient response. Amplifier 19 compares the output signal envelope on line 15' to a reference voltage signal Vref. The amplified difference of these signals on line 19' adaptively adjusts the bias of summing block 14, for causing the output signal envelope to be maintained substantially equal to Vref.

DETAILED DESCRIPTION

FIG. 3 depicts a more detailed schematic representation of the circuitry of FIG. 2. Identical reference numerals are used in both figures, where appropriate.

Summing block 14 comprises two differential amplifiers 30 and 31 whose current outputs are summed across load resistors 32 and 33. Differential amplifier 30 comprises NPN transistors 34,35 and resistors 36,37, respectively, which set the transconductance gain. Differential amplifier 31 likewise comprises NPN transistors 38,39 and resistors 40,41, respectively.

According to an important feature of the invention, envelope detector/differential differentiator circuit 16 comprises NPN transistors 42 and 43 and a capacitor 44. The bases of transistors 42 and 43 receive the differential output on lines 42' and 43', respectively. Because their emitters are connected at node 44', these transistors 42,43 effect a full wave rectification of the signal on lines 42' and 43'. Capacitor 44 is quickly charged, thereby maintaining a voltage on node 44' representing the envelope of the output signal O. An increase in the positive envelope of this signal causing higher peaks on line 42' will cause current to flow in transistor 42. Since the increase in voltage on capacitor 44 is identical to the increase in the positive envelope, the current through capacitor 44 is proportional to the derivative of that envelope. This current also flows into the collector of transistor 42, representing the positive side of the differential differentiator output. Similarly, an increase in the negative envelope on line 43' causes a collector current in transistor 43 proportional to the derivative of the change in the negative envelope. The collector current of transistor 43 represents the negative side of the differential differentiator output.

The function of nonlinear signal-adaptive filter 18 is to mirror the current output from the differentiator portion of circuit 16, in amplified form, onto a tank circuit comprising a capacitor 50, an inductor 51 and resistors 52 and 53. As illustrated, the disturbance event is assumed to be a narrow pulse, but filtered by a first order thermal transient response plus another first order response due to the coupling via capacitor 50 of differential amplifier 31. The resulting trajectory for the nominal second order disturbance transient decay is mimicked by the natural response trajectory of said tank circuit.

Small currents in transistor 42 are "mirrored" by a diode-configured transistor 60, PNP transistors 61,62 and NPN transistors 63,64. Accurate ratios in the mirrored currents are assured by the associated emitter resistors 65,66,67,68,69. Because emitter resistors 66 and 69 of transistors 61 and 64, respectively, are a fraction (1/n) of the value of the resistors 65, 67, and 94, the resulting current induced in the tank circuit is a multiple (n) times the collector current in transistor 42.

If the current in transistor 60 induces a voltage in its emitter resistor 65 greater than the voltage needed to cause current to flow in diodes 70,71, current will also flow in transistors 72,73, respectively. Because the emitter resistors 74,75 associated with transistors 72 and 73 are much smaller than those of transistors 60, 62 and 63, the resulting current through the tank circuit increases much more rapidly than the current in transistor 60. Circuit values are chosen such that this diode drop "threshold" is exceeded only during an additive disturbance.

For input currents from transistor 43, transistors 80-86, diodes 87,88 and emitter resistors 89-95 function identically with the counterparts described in connection with transistor 42.

At the onset of an additive disturbance X to the input signal I, a narrow pulse of current flows in transistor 42 (or transistor 43 for a negative disturbance). This current rapidly exceeds the aforementioned threshold, and large equal currents flow in transistors 72 and 73. This current pulse charges capacitor 50 until the differential tank voltage T, applied to the input of differential amplifier 31, just cancels the additive disturbance. Small resistors 96 and 97 in series with the tank circuit provide phase lead, enhancing the stability of the loop during this event.

During the transient portion of the disturbance, any difference between the additive disturbance and the tank voltage T causes signal peaks on either line 42' or 43' (depending on the algebraic sign of the error) to exceed the envelope voltage at node 44'. This causes small current pulses to be generated in the tank circuit which charge/discharge capacitor 50, for thereby reducing the error.

The differential input signal I, the differential output signal O and the differential tank signal T are illustrated in FIG. 1. Quickly, the tank voltage T matches the disturbance step, keeping the output signal O largely within the prescribed envelope. As the transient proceeds, signal peaks begin to penetrate the negative envelope because the disturbance time constants in this case are faster than their nominal values. As shown in FIG. 1, small current pulses cause corrective jumps in the tank circuit voltage, reducing the error.

Returning to FIG. 3, the reference voltage Vref and high gain differential amplifier 19 provide the bias for differential amplifiers 30 and 31 in the summing block 14. (In amplifier 19, PNP transistors 100 and 101 and NPN transistors 102 and 103, together with resistors 104 and 105, are configured to operate as though they were an emitter-coupled, differential pair of PNP transistors preferably with very high gain. This adaptive bias feedback loop can be described as follows: The high gain of differential amplifier 19 forces node 44' to be very nearly equal to Vref. The output current from differential amplifier 19 in line 19' flows through NPN transistor 106 and resistor 107 in summing block 14. Because resistor 107 is twice the value of resistors 108 and 109, twice the amount of the differential amplifier output current in line 19' is mirrored in transistors 110 and 111. For zero differential input, these currents also flow in load resistors 32 and 33. Since resistor 112 is the same size and has the same voltage across it as resistors 32 and 33, the loop is balanced when differential amplifier 19 provides exactly half this current to its output 19'. Capacitor 113 filters the biasing so that the voltage at node 44' represents the envelope of the signal over a very long time period. In this manner, capacitor 113 establishes the "dominant pole" in this feedback loop, ensuring stability.

This adaptive bias feedback loop forces the envelope, represented at node 44', to be essentially equal to the reference voltage Vref, a previously stated. This is significant for the following reason: In the absence of a disturbance, small current pulses are necessary to keep capacitor 44 charged. The size of these charging pulses is directly proportional to the discharge current flowing through resistor 114. Since node 44' is nearly equal to Vref, this current is very small. The aforementioned current pulses are mirrored (multiplied by n) in capacitor 50. The resulting tank voltage T is added to the input signal I in the summing block, corrupting the output signal O with correlated noise. This correlated noise is therefore inversely proportional to the gain of the differential amplifier 19.

From the foregoing, it will be seen that, during a disturbance, a good estimate of the additive disturbance X is produced at the tank output T and subtracted from the disturbed input signal I, yielding an output signal O free of the disturbance. Conversely, in the absence of any disturbance, the adaptive bias feedback loop permits excellent filtering, ensuring that the tank output signal T has negligible noise.

While the invention has been shown and described with respect to a preferred embodiment thereof, it will be understood by those skilled in the art that changes in form and detail may be made in this embodiment without departing from the scope and teaching of the invention. Accordingly, the method and circuitry herein disclosed are to be considered merely as illustrative, and the invention is to be limited only as specified in the claims.

We claim:

1. Circuitry for suppressing additive transient disturbances in an analog input data signal, comprising:
    summing means for algebraically summing the input data signal with a corrective feedback signal for providing an output signal;
    means responsive to a feedback of said output signal for providing a control parameter that is the derivative of a voltage amplitude envelope corresponding to an envelope of said output signal; and
    nonlinear signal-adaptive filter means for converting said control parameter into the corrective feedback signal, said feedback signal substantially replicating each additive transient disturbance for subtraction from the input data signal by said summing means to render the output signal substantially free of the additive disturbance.

2. The circuitry of claim 1, including:
    means, providing a reference voltage signal setting the amplitudes of the envelope, for applying a bias to said summing means; and
    means responsive to the envelope of the output signal for adaptively modifying said bias to maintain the envelope of the output signal substantially equal to said reference voltage.

3. The circuitry of claim 1, wherein the disturbance is due to thermal asperity transients caused by a magnetoresistive transducer contacting a storage surface moving relative to said transducer.

4. The circuitry of claim 1, wherein said feedback responsive means comprises an envelope detector and a differentiator.

5. The circuitry of claim 4, wherein the envelope detector outputs the additive disturbance as a step which is converted to a short pulse by the differentiator for providing said other signal.

6. Circuitry for suppressing an additive transient disturbance in an analog differential input data signal, comprising:
    summing means for algebraically summing the differential input data signal with a differential corrective feedback signal for providing a differential output signal;
    an envelope detector/differential differentiator means for receiving a feedback of said differential output signal and providing a differential current that is the derivative of a voltage amplitude envelope corresponding to an envelope of said differential output signal; and
    nonlinear signal-adaptive filter means for converting said differential current into the corrective feedback signal, said feedback signal substantially replicating the additive transient disturbance for subtraction from the data input signal by said summing means to render the output signal substantially free of the additive disturbance.

7. The circuitry of claim 6, wherein the envelope detector/differential differentiator comprises two transistors, each having a base for receiving a respective one of the positive and negative phases of the differential output signal, an emitter connected via a common node to a capacitor for effecting full wave rectification of said differential output signal, and a collector providing a respective output proportional to the derivative of the positive and negative change, respectively, of the envelope when either phase exceeds the amplitude of the envelope.

8. The circuitry of claim 6, including:
    means for providing a reference voltage signal;
    means including a biasing output from an envelope detector portion of said envelope detector/differential detector and said reference voltage signal for providing a bias to said summing means; and
    means including said biasing output for adaptively modifying said bias to maintain the envelope of the output signal substantially equal to said reference voltage.

9. The circuitry of claim 6, wherein said filter means includes a passive network comprising reactive and resistive elements having a natural response trajectory corresponding to that of said disturbance.

10. A method for suppressing additive transient disturbances in an analog input data signal, comprising the steps of:
    algebraically summing the input data signal with a corrective feedback signal in a summing means for providing an output signal;
    feeding back said output signal and converting it into a current that is the derivative of an amplitude envelope corresponding to said output signal;
    using a nonlinear signal-adaptive filter means, converting said current into a corrective feedback signal which substantially replicates an additive transient disturbance; and
    subtracting said feedback signal from the input data signal to render the output signal substantially free of said transient disturbance.

11. The method of claim 10, including the steps of:
    applying a common mode bias to the summing means; and
    adaptively modifying the bias responsively to the envelope corresponding to said output signal for reducing noise when no transient disturbance occurs.

12. A method for suppressing additive transient disturbances in an analog differential input data signal, comprising the steps of:
    using a summing means, algebraically summing the differential input data signal with a differential corrective feedback signal for providing a differential output signal;

feeding back said differential output signal and converting it into a differential current that is the derivative of a voltage amplitude envelope corresponding to said differential output signal;

using a nonlinear signal-adaptive filter means, converting said differential current into a corrective feedback signal which substantially replicates an additive transient disturbance; and subtracting said feedback signal from the data input signal to render the differential output signal substantially free of said transient disturbance.

13. The method of claim 12, including the steps of:

applying a common mode bias to the summing means; and adaptively modifying the bias responsively to the envelope corresponding to said output signal for filtering out noise during absence of a transient disturbance.

* * * * *